Aug. 19, 1930.    W. G. ROSINIA    1,773,602
GAS METER
Filed June 3, 1927

Inventor
William Guy Rosinia
By Chridahl Parker Carlson
Attys

Patented Aug. 19, 1930

1,773,602

UNITED STATES PATENT OFFICE

WILLIAM GUY ROSINIA, OF CHICAGO, ILLINOIS

GAS METER

Application filed June 3, 1927. Serial No. 196,162.

The invention relates to improvements in gas meters, and particularly to gas meters of the diaphragm type.

In gas meters of this type, a diaphragm chamber mounted within a closed gas compartment provides a plurality of gas measuring compartments having synchronized valves for controlling the flow of gas relative thereto. The primary object of the invention resides in the provision of new and improved means for operating the valves.

Customarily, the gas compartment has mounted therein a pair of bellows arranged to be reciprocated transversely of the compartment by the flow of the gas therethrough as determined and controlled by the valves. The valves are in turn operated by and synchronized with the movements of the bellows through suitable linkage. The linkage includes a crank means which is directly connected to the valves, and heretofore it has been necessary to disassemble the linkage and the supporting members therefor in order to make repairs or replacements of worn parts. It is an essential feature of this invention to provide a crank means which may be disassembled without disturbance of any of the other members of the valve controlling linkage.

Figure 1:
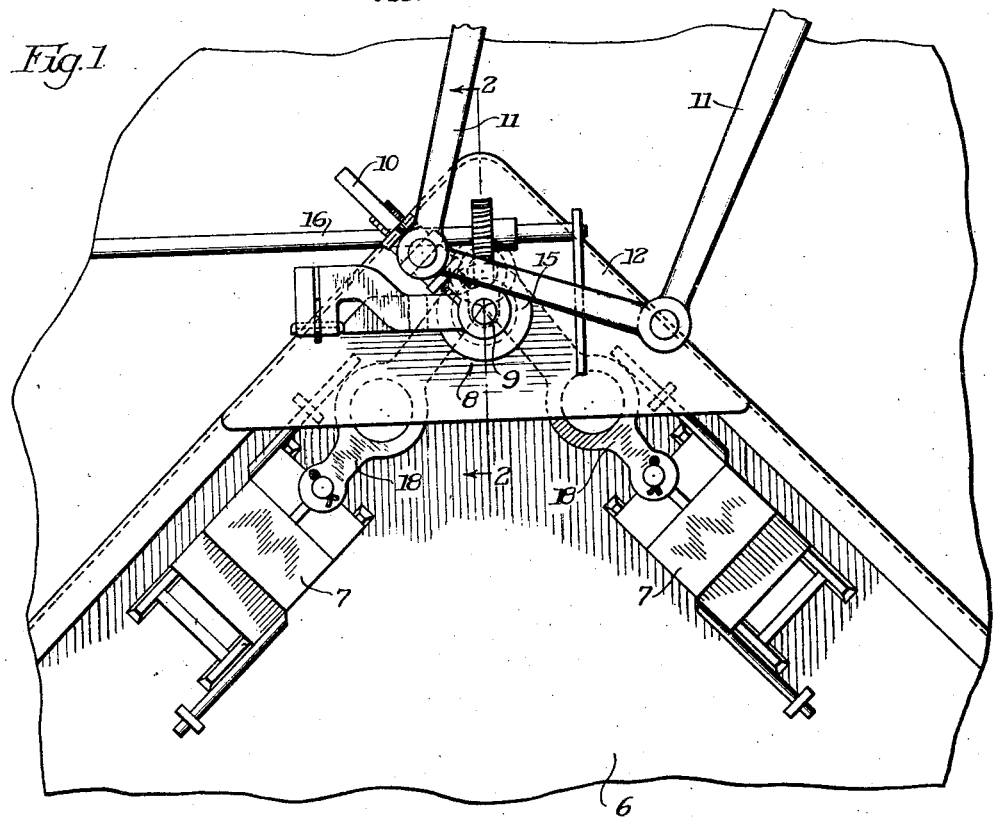

Other objects and advantages will become apparent from the following description and the accompanying drawings, in which Figure 1 is a fragmentary plan view of a gas meter showing the valves and the valve operating linkage.

Figure 2:
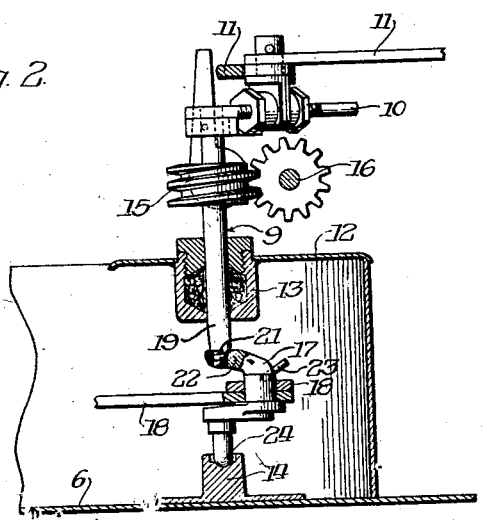

Fig. 2 is a fragmentary view partially in section, taken on the line 2—2 of Fig. 1.

While the invention is susceptible of various modifications and alternative constructions, I have shown and herein described in detail the preferred embodiment but it is to be understood that I do not thereby intend to limit the invention to the specific form disclosed but intend to cover all modifications and alternative constructions falling within the spirit and scope of the invention as expressed in the appended claims.

In the exemplary form of the invention illustrated in the drawings, the gas meter comprises an upper chamber or gallery which is separated from a lower or diaphragm chamber by means of a suitable plate or table 6 secured therein. The lower chamber is divided into four gas measuring compartments by the usual arrangement of a pair of bellows, which are not shown since they form no part of the invention. Within the gallery is mounted a pair of valves 7, each arranged to control the passage of gas to or from two of the measuring compartments. Valve controlling linkage, designated generally at 8, is interposed between the valves and the bellows in the diaphragm chamber to effect the operation of the valves by the reciprocating movement of the bellows.

The linkage 8, in its usual form, comprises a crank shaft 9 mounted vertically of the meter and having at its upper end a horizontal tangent arm 10. Rotating of the crank shaft and the tangent arm is effected by such means as the links 11 arranged to be oscillated by the movement of the bellows, which oscillation is translated into the rotary movement of the crank shaft 9.

As may be seen in Fig. 2, the crank shaft is suitably supported in its vertical position by means of a horizontal or triangle plate 12 spaced from the table. The crank shaft preferably extends through a suitable packing gland 13 mounted in the plate 12, and a bearing or seat 14 secured, as by soldering, to the table 6 receives the lower end of the crank shaft 9. A worm gear 15 mounted on the shaft is associated with a gear 16 which operates the customary indexing mechanism (not shown).

The portion of the crank shaft 9 below the plate 12 is provided with a suitable crank 17 which carries a pair of valve arms 18 connected one to each of the valves 7.

Heretofore, the crank arms of devices of this type have been formed as a rigid unitary structure. When, as frequently occurred, it became desirable to remove or replace any of the various parts of the crank shaft assembly for repairs, inspection or any other cause, it was necessary to disassemble the entire structure. To obviate this undesirable feature, a crank shaft has been provided which is separable into two parts and may readily be withdrawn from or replaced in the supporting structure.

To this end the crank shaft 9 in the present embodiment comprises an upper section 19 including the shaft which extends through the packing gland 13, and a lower section which includes the crank 17. The upper section is screw threaded at the lower end, as at 21, and engages a suitable screw threaded opening 22 in the lower section to secure the two sections in one unit. Means such as the pin 23 is provided on the crank to prevent the valve arms 18 from being displaced from the bearing surface of the crank.

The disposition of the parts is such that sufficient clearance is allowed between the gland 13 and the crank 17 so that the lower bearing end 24 of the crank may be withdrawn from its bearing 14 on the table. Thus to disassemble the crank unit, it is only necessary to lift the crank shaft 9 until the shaft is free from the lower bearing 14 when the crank 17 may be unscrewed from the shaft 19 and removed from the assembly. The assembling operation is equally simple.

It will be apparent from the foregoing that an assembly has been provided in which repairs or replacements of the essential parts of the operating linkage may be readily and simply performed with a minimum of labor. Moreover, the undesirable feature which necessitated the disassembly of substantially the entire linkage has been eliminated by the invention.

I claim as my invention:

1. In a gas meter, in combination, a table mounted in the meter to provide an upper compartment, a triangularly shaped member spaced from said table within said compartment, a shaft, means on said member for rotatably supporting said shaft, means for rotating said shaft during the operation of the meter, a crank having a lower end in axial alignment with said shaft, a bearing seat secured on said table and arranged to receive the lower end of said crank, a valve, detachable means operatively connecting said valve with said crank, and means for detachably securing said crank to said shaft.

2. In a gas meter, in combination, a table constituting the lower wall of a compartment, a triangularly shaped member mounted in spaced parallel relation thereover, a bearing in said member, a bearing seat mounted on said table immediately beneath the bearing in said member, a crank shaft comprising a shaft portion journaled in the said bearing and a crank portion detachable therefrom having a lower end in axial alignment with said shaft portion and supported in said bearing seat, a valve mechanism mounted on said table, and operating means connecting the crank portion of said crank shaft with said valve mechanism, said crank portion being spaced from said member sufficient to permit limited longitudinal movement of said shaft portion to permit said crank portion to be detached from said shaft portion.

3. In a gas meter, in combination, a partition in the meter, a pair of valves mounted on said partition, and means for operating said valves in sequence, said means including a two part crank shaft comprising an upper shaft section rotatably supported in spaced relation from said partition, a lower crank section adapted normally to rotate in a bearing on said partition, and means for detachably securing said sections together.

4. In a gas meter, in combination, a pair of gas flow controlling valves, a crank shaft comprising an upper shaft section, a lower crank section, and means for detachably securing the two sections together, and means operatively connecting said crank section to said valves to actuate the latter upon rotation of said shaft.

5. In a gas meter, in combination, a valve, and means for controlling the movement of said valve, said means including a crank shaft having separable parts, and means operatively connecting said valve and said crank shaft, said last mentioned means being detachable from said crank when said crank shaft is disassembled.

In testimony whereof, I have hereunto affixed my signature.

WILLIAM GUY ROSINIA.